(12) United States Patent
Havinis et al.

(10) Patent No.: US 6,191,737 B1
(45) Date of Patent: Feb. 20, 2001

(54) SYSTEM AND METHOD FOR MOBILE STATION POSITION DETERMINATION ALONG BORDER AREAS

(75) Inventors: Theodore Havinis, Plano; Dimitris Papadimitriou, Dallas, both of TX (US)

(73) Assignee: Ericsson Inc., Research Triangle Park, NC (US)

( * ) Notice: Under 35 U.S.C. 154(b), the term of this patent shall be extended for 0 days.

(21) Appl. No.: 09/209,312

(22) Filed: Dec. 11, 1998

(51) Int. Cl.[7] ................................ G01S 3/02; H04Q 7/20
(52) U.S. Cl. ............................................. 342/450; 455/456
(58) Field of Search ............................ 342/450; 455/456

(56) References Cited

U.S. PATENT DOCUMENTS 6,064,885 * 5/2000 Rouhollahzadeh et al. ......... 455/439

* cited by examiner

Primary Examiner—Thomas H. Tarcza
Assistant Examiner—Fred H. Mull
(74) Attorney, Agent, or Firm—Jenkens & Gilchrist, P.C.

(57) ABSTRACT

An improved system and method for determining a position of a mobile station in a mobile telecommunications system is disclosed. The system includes identifying a number of location measuring units (LMUs) for measuring the time of arrival of signals generated by the mobile station. In the event one or more of the LMUs is associated with a mobile switching center (MSC) other than the MSC serving the mobile station, then information pertaining to the identified LMUs and the other MSC is sent to the serving MSC. The serving MSC sends a position request message to those identified LMUs associated therewith, encapsulates the position request message and sends the encapsulated message to the other MSC. The other MSC thereafter unpacks the position request message and forwards the unpacked position request message to the identified LMU associated with the other MSC. Following the measuring of timing information, the LMU associated with the other MSC sends its timing measurement results to the other MSC, which thereupon encapsulates the results and forwards the encapsulated results to the serving MSC.

14 Claims, 2 Drawing Sheets

SYSTEM AND METHOD FOR MOBILE STATION POSITION DETERMINATION ALONG BORDER AREAS

BACKGROUND OF THE INVENTION

1. Technical Field of the Invention

The present invention relates, in general, to determining the position of a mobile station within a mobile cellular telecommunications network, and specifically to a system and method for more accurately determining mobile station position along border regions within the mobile cellular telecommunications network.

2. Background and Objects of the Invention

Mobile radio position determination is an emerging field that has gained a great deal of interest lately, and it is now desirable to include a position determination capability in future cellular mobile radio systems. The Time Difference of Arrival (TDOA) position determination method, which is known from military applications, has been used successfully for determining the position of mobile radio terminals. A typical TDOA position determination system can be either terminal based, whereby Time Of Arrival (TOA) measurements are made on the "downlink" in the mobile station (MS), or network based, whereby the network performs the TOA measurements on the "uplink" in the radio base transceiver stations (BTSs). These TOA measurements are then used to calculate TDOA parameters and estimate the position of the mobile station (MS).

A network-based method for determining the position of cellular mobile stations is disclosed in commonly-assigned Swedish Patent Application No. 9303561-3 to R. Bodin. In order to determine the position of a mobile station, a handover procedure is initiated between a serving base transceiver station and the new base transceiver station. The mobile station transmits access request signals to a new base transceiver station. The base transceiver station measures the time delay for the access request signal to travel between the mobile station and the base transceiver station. This procedure is repeated between the mobile station and one or more additional base transceiver stations. A service node in the cellular network calculates the position of the mobile station by utilizing information about the known positions of the base transceiver stations and the measured access time delays.

This network-based method of determining the position of cellular mobile stations relies on so-called asynchronous handovers, where the target base transceiver stations measure the access delays to the mobile station. Each access delay is used as a measure of the distance between the mobile station and the respective base transceiver station. In specific situations, i.e., MS positioning, a number of BSs may concurrently tune to the same transmitting MS in order to make time delay of arrival measurements between the MS and the BSs. The time delay of the signal transmitted by the mobile station during a handover procedure may be measured by the BSs for use by a processing unit to determine the position of the mobile station.

Although the above-described system illustrates considerable progress in the cellular position determination field, there are still a number of deficiencies to be improved upon. There are circumstances in existing systems having TOA-based mobile station positioning capabilities in which the determination of a mobile station position may not be highly accurate. Specifically, the location of a mobile station may be most accurately determined by measuring time delays from locations which surround the mobile station to be located and performing a triangulation calculation based upon the measured time delays. Existing systems may potentially measure time delays from locations which fail to surround the mobile station to be located, especially when the mobile station is located near the border between two areas served by separate mobile switching centers (MSCs) or other entities within the network. Consequently, location determinations in such a scenario will not be highly accurate. There exists a need for a system for more accurately determining the position of a mobile station within a mobile cellular telecommunications network.

SUMMARY OF THE INVENTION

The present invention is directed to a system and method for accurately determining the location of a mobile station in a mobile cellular telecommunications network. The mobile telecommunications network includes a plurality of mobile switching centers (MSCs) to which a number of base station systems are communicatively associated to provide wireless telecommunication services as is known in the art. In addition, a plurality of mobile location centers (MLCs) are associated with the MSCs in the telecommunications network to control network resources in executing a mobile station positioning determination. A single MLC may be associated with a number of MSCs within the telecommunications network. Further, a database is maintained by each MSC which includes a listing of the neighboring MSCs possessing mobile station positioning capabilities.

The present system further includes a plurality of location measurement units (LMUs) which perform radio measurements for supporting the MLCs in determining TOA-based mobile station positioning. Specifically, an LMU is capable of measuring a time of arrival of access burst signals transmitted by the mobile station to be located. An LMU communicates with its respective MLC via its assigned base station and MSC.

According to the present invention, an application may request the location of a particular mobile station. The MLC corresponding to the visiting MSC (VMSC) serving the mobile station may be forwarded the location determination request. Based upon the general location of the mobile station within the area served by the VMSC, the corresponding MLC identifies the appropriate LMUs for most accurately measuring the TOA of signals transmitted by the mobile station. In the event the mobile station is roaming near the border of two areas served by neighboring MSCs controlled by the same MLC, such as the areas served by the VMSC and one of its neighboring MSCs, at least one of the LMUs identified by the MLC for performing the TOA measurements may be located in the area served by the neighboring MSC. The MLC transmits a signal to the VMSC including information pertaining to the identified LMUs and their corresponding MSCs (the VMSC and the neighboring MSC, in this case).

Upon reception of the information, the VMSC accesses its database to verify that information pertaining to another MSC transmitted by the MLC is a neighboring MSC and possesses location determination capabilities. The VMSC then forwards the signal to its own identified LMUs as a DTAP message. Upon verifying that the identified MSC is a neighboring MSC having positioning capabilities, the VMSC encapsulates a DTAP message within a signal and transmits the encapsulated DTAP message to the identified, neighboring MSC. The neighboring MSC unpacks the DTAP message and forwards the DTAP message on to its LMU identified by the MLC. Following each LMU identified by the MLC receiving the DTAP message, the TOA measurements are undertaken.

Upon completion of the TOA measurements, each LMU returns the measurement information to the VMSC. The timing measurements taken by the LMU(s) associated with the neighboring MSC are transmitted as a DTAP message to the neighboring MSC, after which the neighboring MSC encapsulates the DTAP message and forwards the encapsulated message to the VMSC. The VMSC unpacks the encapsulated DTAP message and sends the received DTAP messages to the MLC. Based upon the timing measurements, the MLC calculates the position of the mobile station. By employing one or more LMUs of a neighboring MSC in the TOA analysis so as to suitably surround the mobile station to be located, the position of the mobile station is very accurately determined.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
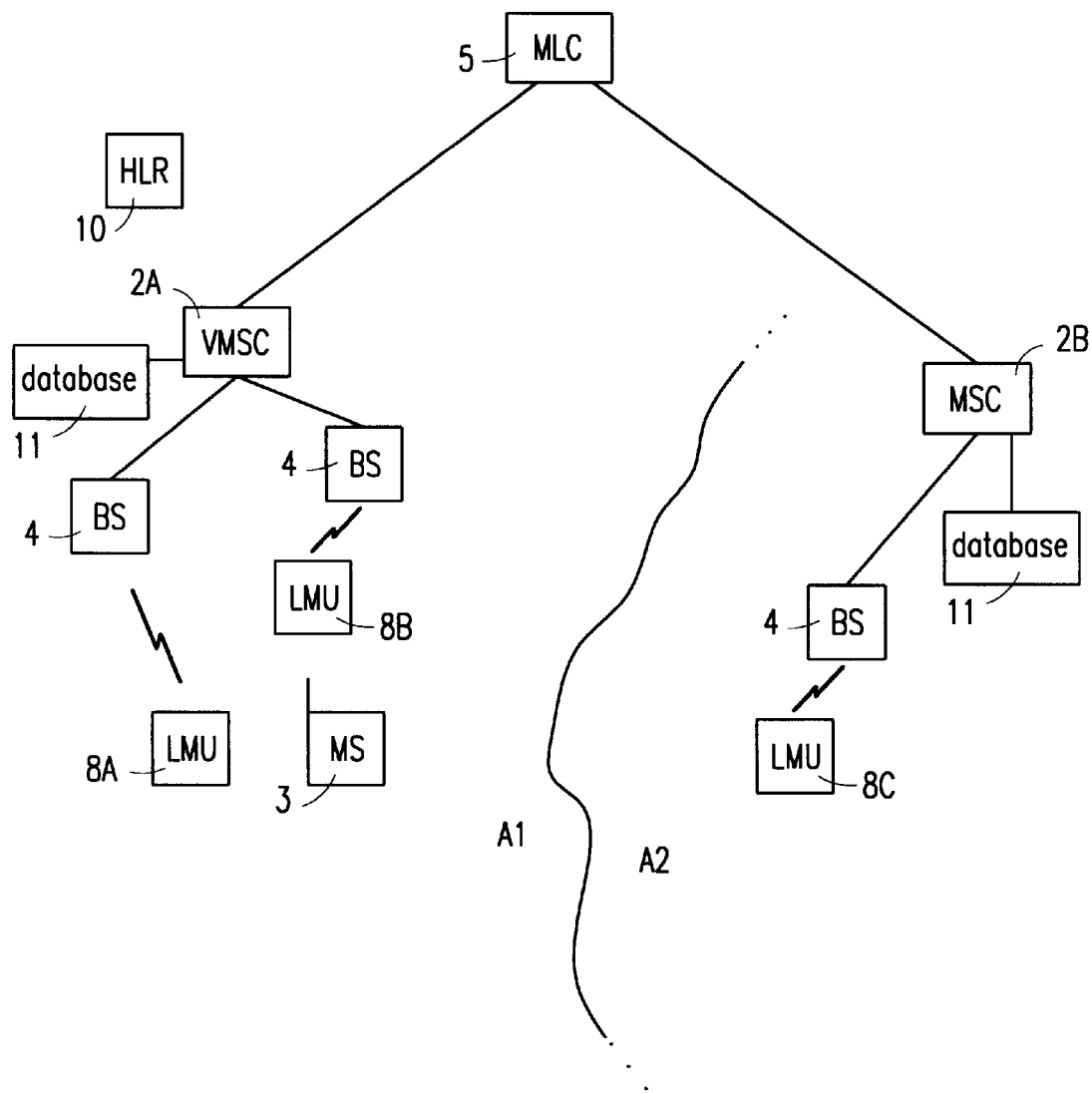
FIG. 1 is a block diagram of a portion of a mobile cellular telecommunications system according to the present invention.

Referring to FIG. 1, there is shown a mobile cellular telecommunications system 1 according to the present invention. Telecommunications network 1 preferably includes a plurality of mobile switching centers (MSCs) 2 which provide call set-up, routing, control and termination operations to one or more mobile stations 3. Each MSC 2 is preferably associated with one or more base stations 4 so as to serve a specific geographical area within the telecommunications network. The communicative relationship between a base station 4 and its corresponding MSC 2 in system 1 in providing conventional telecommunication services to a mobile station 3 is well known in the art. An MSC 2 may be utilized by a roaming mobile station (MS) 3 as a visiting mobile switching center (VMSC) 2A.

Telecommunications network 1 preferably further includes a mobile location center (MLC) 5 associated with MSCs 2. MLC 5 is a node which manages the overall coordination and scheduling of resources within its assigned area of telecommunications network 1 in order to perform mobile station positioning determinations, as explained below. An MLC 5 in telecommunications network 1 may serve as a gateway mobile location center (GMLC) which an external location area (LA) may access in requesting a determination of a mobile station position. An MLC 5 serving an area in which mobile station 3 is located is referred to as the serving mobile location center (SMLC) therefor. It is understood that a plurality of MLCs 5 may be utilized in network 1, with each MLC 5 providing positioning services for the network area to which MLC 5 is assigned.

The present telecommunications network 1 preferably further includes a plurality of location measurement units (LMUs) 8. LMUs 8 perform timing-related, radio signal measurements, such as TOA measurements of access burst signals transmitted by a mobile station 3, to support location services. The timing-related signal measurements are preferably provided to an MLC 5 for facilitating MLC 5 in calculating the location of a mobile station, as explained below.

The LMUs 8 of telecommunications system 1 are preferably disposed substantially uniformly about the area served thereby. LMUs 8 preferably communicate with their corresponding MLCs 5 via the air interface. Accordingly, each LMU 8 has a serving base station 4 and MSC 5, and has its own subscription profile in a home location register 10.

In order to accurately determine the position of a mobile station 3, it is necessary to identify at least three LMUs 8 which are disposed relatively closely around mobile station 3. When a mobile station 3 to be located is near the border of two MSC serving areas A1 and A2, the three LMUs 8 which may most accurately measure the time of arrival of access signals may be not served by the VMSC 2A. In such instances, it is necessary to undergo additional steps to coordinate the measuring of signals by LMUs 8 in different MSC serving areas. One such step is to establish an interface between the VMSC 2A and the neighboring MSC 2B to facilitate the ordering and receiving of TOA measurements by multiple MSCs 2. In a preferred embodiment of the present invention, a MAP interface is established between a VMSC 2 and a neighboring MSC 2B, such as within a radio resource management sublayer. For situations in which LMUs 8 are identified for performing TOA measurements which are associated with VMSC 2A and neighboring MSC 2B, the request to perform the TOA measurements is transported from MLC 5 to VMSC 2A and is then encapsulated and forwarded to MSC 2B over the MAP interface.

Another additional step is to verify that any MSCs 2 corresponding to the LMUs 8 identified by the MLC 5 are neighboring MSCs 2 and that both MSCs 2 possess positioning capabilities, such as being capable of communicating over the MAP interface. In a preferred embodiment of the present invention, a database 11 is maintained by each MSC 2 having stored therein a list of its neighboring MSCs 2 which are capable of participating in a TOA-based positioning service. A database 11 is accessed by an MSC 2 corresponding thereto in response to MLC 5 informing the MSC 2 of a request to locate a mobile station 3 using one or more LMUs 8 associated with another MSC 2.

Figure 2:
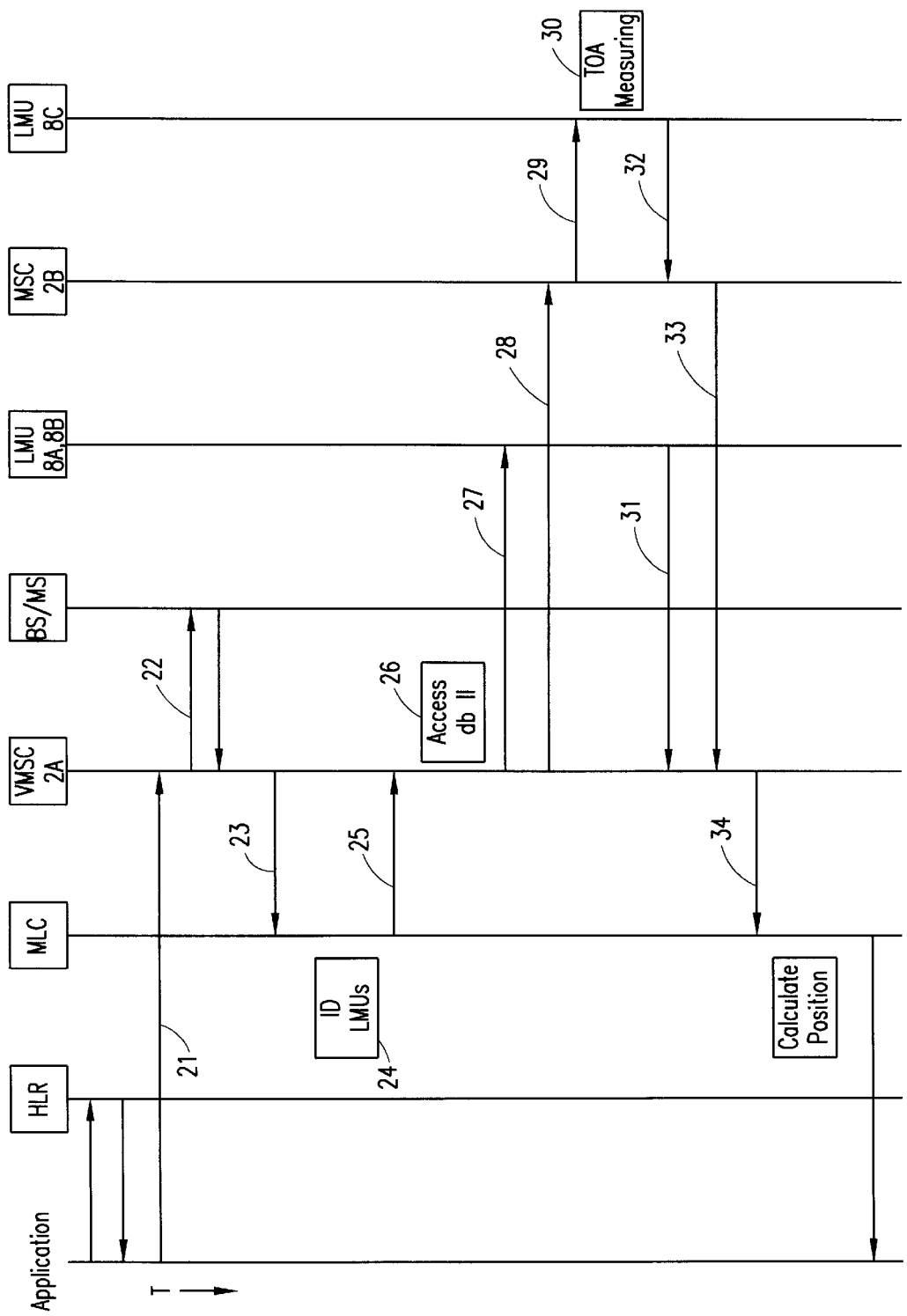
FIG. 2 is an event chronology of the mobile station positioning operation in accordance with the present invention.

The method of determining the location of a mobile station is described below with reference to FIG. 2. Initially, an application requests the position of a mobile station 3. The request may include parameters specified by the requesting party, such as preferred/required positioning method, degree of accuracy, response time, etc. Upon determining from Home Location Regist/(HLR) 10 that mobile station 3 is being served by VMSC 2A, the positioning request is sent thereto at step 21. Next, VMSC 2A communicates with mobile station 3 or serving base station 4 at step 22 and receives, among other data, the current cell identification for mobile station 3. Upon receiving the data from mobile station 3 or base station 4, VMSC 2 sends the positioning request to MLC 5 at step 23, together with the current cell identification for mobile station 3.

Following receipt of the positioning request and the identification of the current cell for mobile station 3, MLC 5 identifies at step 24 the LMUs 8 which are to perform TOA measurements of access burst signals transmitted by mobile station 3. In this example, it is assumed that mobile station 3 is near the border of adjacent serving areas A1 and A2 served by VMSC 2A and neighbor MSC 2B, respectively. As a result, MLC 5 identifies LMUs 8A–8C for performing the TOA measurements, with LMUs 8A and 8B being associated with VMSC 2A and LMU 8C being associated with neighboring MSC 2B. Next, MLC 5 sends a MAP position request command at step 25 to VMSC 2A, having therein the identification of LMUs 8A–8C, VMSC 2A and MSC 2B. Because the MAP position request command received by VMSC 2A includes an identification of another MSC (MSC 2B, in this case), VMSC 2A accesses its database 11 at step 26 and verifies that MSC 2B is a neighboring MSC which is capable of supporting the MAP interface and communication thereover.

Following verification that MSC 2B is a neighboring MSC and can participate in the positioning service, VMSC 2A sends a DTAP positioning request signal to LMUs 8A and 8B at step 27, encapsulates a similar DTAP positioning request signal identifying LMU 8C within a MAP interface signal and sends the MAP interface signal to MSC 2B at step 28 over the MAP interface. In response to the reception of the MAP interface signal from VMSC 2A, MSC 2B unpacks the DTAP positioning request and forwards the DTAP request to LMU 8C at step 29. Thereafter, the request to perform TOA measurements has been successfully communicated to each LMU 8 identified by MLC 5. At this point, the TOA measurements are taken at step 30.

The TOA measurement results from LMUs 8A and 8B are sent to VMSC 2 as a DTAP message at step 31. The TOA measurement results from LMU 8C are sent to MSC 2B as a DTAP message at step 32. In response thereto, MSC 2B encapsulates the DTAP message sent by LMU 8C and transports the encapsulated message over the MAP interface to VMSC 2A at step 33. VMSC 2A unpacks the DTAP message from LMU 8C and sends the TOA measurements to MLC 5 at step 34. Thereafter, MLC 5 calculates the position of mobile station 3 based upon the TOA measurements from LMUs 8A–8C.

Due to LMU 8C measuring the TOA of access burst signals from mobile station 3, TOA measurements were taken from LMUs 8 which substantially surround mobile station 3. As a result, a relatively highly accurate position may be determined.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of determining a position of a mobile station within a telecommunication system, comprising the steps of:
   receiving a request to perform a position determination of said mobile station;
   identifying location measuring units (LMUS) within said telecommunications system for measuring a time of arrival of signals generated by said mobile station, and mobile switching centers (MSCs) associated with said identified measuring units;
   sending said request and data concerning said identified LMUs and said identified MSCs to an MSC serving said mobile station;
   verifying a second MSC associated with at least one of said identified LMUS is capable of participating in a mobile station position determination;
   forwarding said request from said serving MSC to said second MSC based upon an affirmative determination that said second MSC is capable of participating in said mobile station position determination;
   forwarding said request received by said second MSC to said identified LMU associated with said second MSC;
   measuring time of arrival signals generated by said mobile station by said LMU associated with said second MSC;
   sending said measurements from said measuring unit associated with said second MSC to said second MSC; and
   sending said measurements from said second MSC to said MSC serving said mobile station.

2. A telecommunications system, comprising:
   a mobile location center (MLC);
   a plurality of location measurement units (LMUs) positioned about said system;
   a plurality of mobile switching centers (MSCs) associated with said MLC, a first MSC of said MSCs including a means for receiving a request to locate a mobile station within said system and a means for sending a request to LMUs identified in said request; and
   a plurality of databases, each said database being accessible by a distinct MSC and containing a listing of MSCs having service areas which border said distinct MSC;
   wherein said first MSC selectively accesses said database prior to sending said request to said identified LMUs.

3. The system of claim 2, wherein:
   each said database includes an indication whether said MSCs are capable of participating in a mobile station location determination.

4. A method of determining the location of a mobile station within a mobile telecommunications network, comprising the steps of:
   receiving a request to locate a mobile station;
   identifying a plurality of location measurement units (LMUs) for performing timing-based measurements, and mobile switching centers (MSCs) associated with said identified LMUs;
   sending said request to a first MSC of said identified MSCs;
   verifying a service area of a second MSC of said identified MSCs is adjacent a service area of said first MSC;
   sending said request received by said first MSC to an identified LMU associated therewith;
   sending said request received by said first MSC to a second LMU associated with said second MSC based upon an affirmative determination that said service area of said second MSC is adjacent said service area of said first MSC;
   performing a timing-based measurement by said identified LMUs;
   sending said timing-based measurements to said first MSC; and
   calculating a position of said mobile station based upon said timing-based measurements received by said first MSC.

5. The method of claim 4, wherein said step of sending to said second LMU comprises the steps of:

preparing a measurement request signal;

encapsulating said measurement request signal within an interface signal;

sending said interface signal from said first MSC to said second MSC;

unpacking said encapsulated measurement request signal from said interface signal received by said second MSC; and sending said unpacked measurement request signal to said second LMU.

6. The method of claim 4, wherein said step of sending said timing-based measurements comprises the steps of:

encapsulating said timing-based measurements within an interface signal;

sending said interface signal from said second MSC to said first MSC; and unpacking said encapsulated timing-based measurements from said interface signal received by said first MSC.

7. The method of claim 4, further comprising the step of:

maintaining a database of MSCs having neighboring service areas.

8. The method of claim 7, wherein the maintaining step comprises the step of:

maintaining a database at each MSC, said database for an MSC containing a listing of neighboring MSCs capable of participating in said mobile station location determining.

9. The method of claim 4, wherein said step of sending said request to said first MSC comprises the step of:

sending an indication of said identified LMUs to said first MSC.

10. The method of claim 4, wherein said step of sending said request to said first MSC comprises the step of:

sending an indication of said identified MSCs to said first MSC.

11. The method of claim 4, further comprising the step of:

verifying said second MSC is capable of participating in said mobile station location determining.

12. The method of claim 4, further comprising the steps of:

maintaining a database of MSCs which are capable of participating in said mobile station determination; and accessing said database to verify said second MSC is capable of participating in said mobile station location determination.

13. The method of claim 4, wherein said step of sending said location request to said second LMU comprises the steps of:

sending said location request received by said first MSC to said second MSC utilizes the radio resource management sublayer; and sending said location request received by said second MSC to said second LMU.

14. The method of claim 4, wherein said step of sending said timing measurements to said first MSC comprises the steps of:

sending said timing measurements from said second LMU to said second MSC; and sending said timing measurements received by said second MSC to said first MSC utilizing the radio resource management sublayer.

* * * * *